Figure 2:
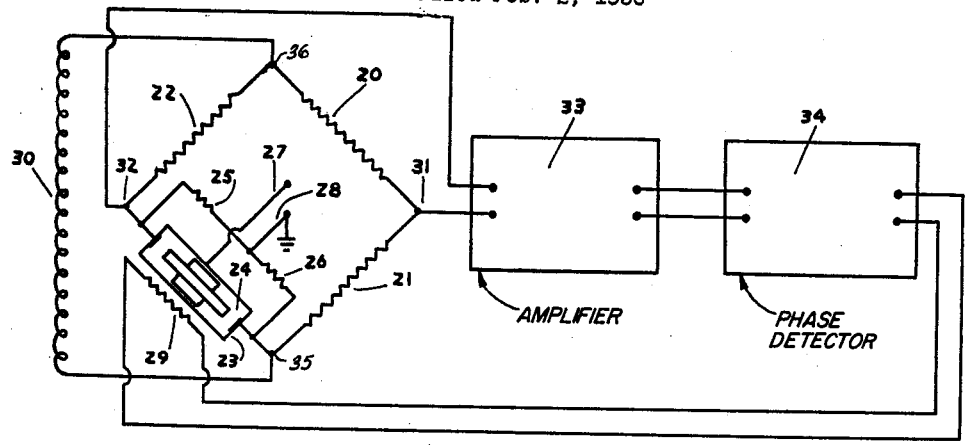

Feb. 5, 1963   G. P. BENTLEY   3,076,885
TEMPERATURE CONTROL SYSTEM FOR VISCOUS FLUID INSTRUMENTATION
Filed Feb. 2, 1956

INVENTOR.
GEORGE P. BENTLEY.
BY
EZEKIEL WOLF
HIS ATTORNEY.

3,076,885
TEMPERATURE CONTROL SYSTEM FOR VISCOUS FLUID INSTRUMENTATION
George P. Bentley, Franklin, Mass., assignor to Instrument Development Laboratories, Inc., Needham Heights, Mass., a corporation of Massachusetts
Filed Feb. 2, 1956, Ser. No. 563,111
8 Claims. (Cl. 219—20)

The present invention relates to a means and method for controlling the temperatures of a viscous liquid in instruments where the viscosity of the liquid is required to be maintained at a constant value or within very narrow limits.

Such instruments in which the present invention may be successfully and usefully applied include integrating accelerometers, such as shown in United States patent application Serial No. 348,171, filed April 13, 1953, to which the present invention is particularly applicable, gyro and gyro controlled apparatus and other measuring instruments in which viscosity and temperature bear a definite functional relationship in the operation of the instrument.

In the present case this is accomplished by the sensing of the resistivity of the viscous liquid medium and the stabilization of the viscosity of the liquid by maintenance of constant resistivity through liquid temperature control.

In the present invention a system may be employed in which the viscous medium may be incorporated as an arm in an impedance or Wheatstone bridge, and heat may be applied to the arm to maintain the temperature necessary to maintain a balance on the bridge. In such a case when a temperature balance is obtained, the viscosity of the fluid in the instrument is at the desired value for the desired operation of the instrument.

The physical relationship between viscosity and resistivity of a liquid which assures that maintenance of constant resistivity by temperature control will produce constant viscosity is expressed as Walden's rule and states that $G_0\eta_0$=constant, where $G_0$ is the liquid conductivity and $\eta_0$ is liquid viscosity.

When incorporating the instrument as a part of an impedance or Wheatstone bridge, materials used for the bridge resistance elements are selected so that their temperature coefficients of resistance will be very low in comparison with that of the control medium. A temperature rise in the fluid above its specified value will decrease the fluid resistance and produce an output signal from the bridge. Correspondingly, a drop in temperature will produce an error signal of the opposite phase. A phase sensitive amplifier, based on design considerations well known in the field, may be used to provide signals of the appropriate phase to produce a heater current which raises the fluid temperature and rejects signals in the opposite phase.

In bridge circuits of the type employed, electrolytic or conductive liquid resistances are used with alternating current supplies so as to minimize polarization in the liquid with resultant deterioration of the liquid and the cell structure.

One further advantage of the present invention is that a composite bridge circuit can be arranged such that the resistivity of a viscous liquid can be controlled concurrently with the use of the same liquid for functional signal sensing purposes. This will be described in a specific illustration hereafter.

Figure 1:
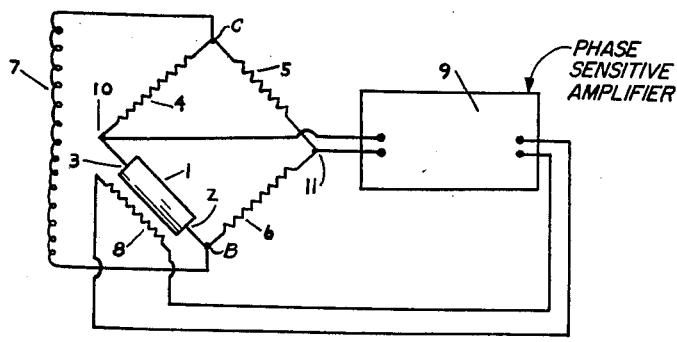

Various types of bridge circuits and other types of circuits for measuring small resistance changes to control the viscosity of a fluid may be used, but the preferred embodiments are described in the specification set forth below when taken in consideration with the drawings, in which:

FIGURE 1 shows an embodiment of a circuit for maintaining the viscosity of the liquid constant in an instrument at normal operating temperatures.

Figure 3:
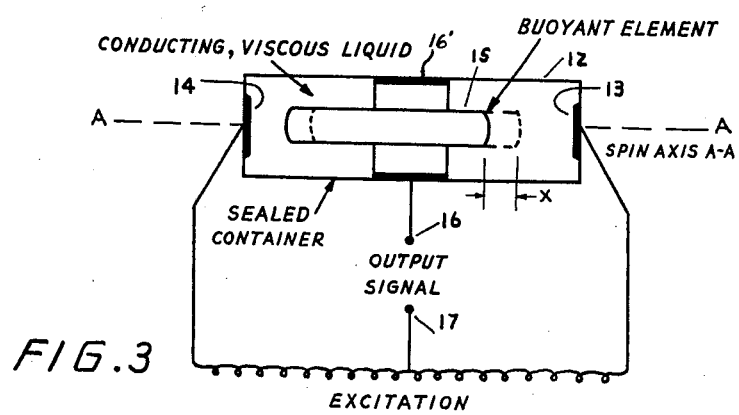

FIGURE 2 shows an application of the temperature control system of FIGURE 1 to an integrating accelerometer, wherein the liquid serves simultaneously as a temperature sensing transducer and as a functional signal pick off device, and FIGURE 3 shows a simplified measuring circuit applied to an integrating accelerometer as a specific example of a displacement indicating device utilizing a conducting viscous liquid.

In the arrangement shown in FIGURE 1, the instrument 1 may be of any type such as an integrating accelerometer, a gyroscope or other measuring or control device which has a viscous liquid contained within an enclosed housing or sealed container made of a suitable non-conductor with electrical connections to the liquid suitably sealed therein. It is desirable to maintain the viscosity of the liquid constant in order to obtain proper functional operation of the device through control of resistivity through proper control of temperature. The instrument has electrodes 2 and 3 connected at each end across the viscous liquid of the instrument as shown diagrammatically in FIGURE 1. The instrument 1 is formed as one arm of an impedance bridge together with the other adjacent arm 4 and the two opposite arms 5 and 6. An exciting voltage 7 may be applied between B and C on the bridge and the instrument may be maintained under desired temperature control by the electrical heating coil 8 which preferably surrounds the said sealed container and which is controlled through the output of the phase sensitive amplifier 9.

In the operation of the circuit of FIGURE 1, a temperature drop in the fluid in the instrument will increase the resistance and produce a signal across the bridge balance terminals 10 and 11, which will call for an increase in the heating in coil 8 to effect a rise in temperature of the fluid in said instrument 1 until a balance has been reached whereupon normal heat or no heat is supplied by coil 8.

In the circuit of FIGURE 1, the resistance elements of bridge arms 4, 5, and 6 have equal resistances and the liquid cell in instrument 1 has the same resistance at normal operating viscosity which corresponds to normal operating temperatures respectively. This operating temperature is somewhat above the ambient temperature to permit effective control.

The circuit of FIGURE 3 shows a simplified cross-section of a viscous shear type integrating accelerometer. The accelerometer housing or casing 12 is an elongated functionally non-conductive tube filled with a viscous liquid with electrodes 13 and 14 operatively positioned at predetermined points at opposite ends of said casing and with a central electrode 16' positioned at a predetermined point therebetween. A buoyant element or body 15 is freely suspended in said fluid and is radially centered in the casing when the casing is spun on its axis A—A. The buoyant element 15 may be either conductive or non-conductive. An acceleration of the accelerometer will move the buoyant body a distance determined by the acceleration of the instrument and the viscosity of the liquid. The distance moved by the buoyant body will change the liquid resistance between electrodes 14 and 16' and between 16' and 13 resulting in an output signal across the terminals 16 and 17.

If the accelerometer casing 12 is properly constructed, the decrease in liquid resistance between 14 and 16' due to the motion of the buoyant element will be exactly equal to the increase in liquid resistance between electrodes 16' and 13. Thus, the end to end resistance between electrodes 13 and 14 will be unaffected by the functional motion of the buoyant element 15 and the generation of the functional output signal across the terminals 16 and 17.

FIGURE 2 shows the accelerometer of FIGURE 3 introduced into a circuit permitting simultaneous temperature sensing and control and functional operation of the accelerometer and its measuring circuit. A more complete diagram as applied to the accelerometer is indicated in FIGURE 2. In this case the bridge will be formed of two balanced resistances 20 and 21, a third resistance 22 and a combination of elements in which the accelerometer 23 with its contained viscous liquid 24 forms one resistance in parallel with a second element comprising resistances 25 and 26 in series connected across the accelerometer. This latter assembled combination forms the fourth arm of the bridge.

The combination of accelerometer 23 and resistances 25 and 26, therefore, comprise the accelerometer measuring circuit equivalent to that shown in FIGURE 3, except that excitation voltage is obtained by the voltage appearing across the terminals 32 and 35 of the primary bridge.

In the arrangement as indicated in FIGURE 2, an output signal may be obtained across the center connections on the lines 27 and 28 representing the position of the buoyant element at any time. This signal is the desired functional output of the accelerometer at any time, but its accuracy is dependent on the viscosity of the liquid.

To maintain the desired viscosity, an electrical heating coil 29 may be applied to the accelerometer similarly as in FIGURE 2. An excitation for the bridge is applied across terminals 35 and 36 by the transformer secondary 30.

With the bridge thus excited, an output signal will be obtained across terminals 31 and 32 indicating the departure of the resistivity of liquid 24 from the desired nominal resistance. This error signal is amplified by amplifier 33 and converted by phase detector 34 to apply more or less electrical power to the electrical fluid heating coil 29 so as to maintain the resistivity of liquid 24 and consequently the viscosity of the liquid 24 constant. As noted in the description of FIGURE 2, the output temperature error signal across 31 and 32 will be substantially unaffected by the position of the accelerometer buoyant element. Simultaneously with operation of this temperature control loop the accelerometer's functional output signal will be generated across 27 and 28.

In the case of the accelerometer shown in FIGURE 3 the specifications require that the temperature of the liquid be maintained within ±.05° F. of the normal operating temperature which may be 167° F.

Referring to FIGURE 2, and assuming the following conditions to hold:

(1)  $30 = E_{ex} = 20$ volts (R.M.S.)
(2)  $20 = 21 = R_b$
(3)  $25 = R_1 = 50K$ ohms
(4)  $26 = R_2 = 50K$ ohms
(5)  $22 = R_c = 50K$ ohms
(6)  $23 = R_{IA} = 100K$ ohms at 167° F.
(7)  $R_d$ = Resistance of parallel combination of $R_1$, $R_2$, and $R_{IA}$
(8)  $R_d \approx R_c$ (representing small temperature variations as specified above), then it can be demonstrated that $$(9) \quad \Delta E_o = \frac{E_{ex}}{4R_c} \Delta R_d$$

whereas $\Delta E_o$ is the change in output signal across terminals 31 and 32 for a change in the temperature of fluid 24.

Assuming also a temperature coefficient for $R_{IA}$ of 1.5% per ° F., then the pecentage change in resistance $R_{IA}$ will equal 1.5% times 0.05° F. times 100,000 ohms or 75 ohms. Since $$(10) \quad R_d = \frac{R_{IA}(R_1 + R_2)}{R_{IA} + R_1 + R_2}$$

by differentiation $$(11) \quad \Delta R_d = \frac{(R_{IA} + R_1 + R_2)(R_1 + R_2) - R_{IA}(R_1 + R_2)}{(R_{IA} + R_1 + R_2)^2} \Delta R_{IA}$$

Substituting the above values in Equation 11, the change in $R_d$ resulting from a temperature change in the liquid of 0.05° F. $\Delta R_d \approx 19$ ohms. By Equation 9, this change will result in an output signal of approximately 1.9 millivolts. Correspondingly, if a fluid of 4% per ° F. temperature coefficient were used, the same temperature change would cause an output of approximately 5 millivolts.

It will be noted from the above that a sizable signal will be readily obtained for controlling the temperature under general conditions.

A special advantage of this invention arises from the direct proportionality between viscosity and resistivity of the fluid. Although the sensitivity of the system, i.e.

$$\frac{\text{volts output}}{\text{° F. change}}$$

increases as the temperature coefficient of the liquid increases, the resulting increased tightness of control will substantially compensate for the rise in the temperature coefficient of viscosity. It is worth noting that since the maximum temperature change produces a resistance change $$\frac{\Delta R_{IA}}{R_{IA}}$$

the order of 0.1%, the maximum adverse effect of temperature changes on instrument calibration will also be of this magnitude. A further advantage of this invention is the utilization of the electrolyte to perform two separate and simultaneous functions, namely to provide an electrolytic pick-off signal indicating element position, and to furnish the necessary temperature indication.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a control system for an instrument having a nonconductive casing containing a viscous conductive fluid, a buoyant element freely suspended in said fluid so as to be radially centered in said casing when the latter is rotated about its axis and so as to be able to move lengthwise relative to said casing, electrically operated means for sensing a longitudinal movement of said buoyant element with respect to said casing, means for measuring the electrical resistance of said fluid, an electrical heating element disposed in heat conductive relation to said viscous conductive fluid, and means controlled by said resistance measuring means for controlling the operation of said heating element, said electrically operated means being electrically connected so as to form a part of the circuit for said resistance measuring means.

2. In a control system, an instrument having a nonconductive casing containing a viscous conductive fluid, a buoyant element disposed in said fluid, means for sensing a movement of said buoyant element relative to the ends of said casing, a heating element disposed in heat conductive relation to said fluid, means for sensing changes in the viscosity of said fluid, and means controlled by the last mentioned means for controlling the operation of said heating element, said means for sensing movement of the buoyant element being interconnected with the said means for sensing changes in the fluid viscosity.

3. In a control system, an instrument having a non-conductive casing containing a viscous conductive fluid, a heating coil disposed in heat conductive relation to said viscous conductive fluid, a buoyant element suspended in said fluid, means for measuring changes in the electrical resistance of the fluid between each of two predetermined points on said casing and a predetermined point therebetween respectively so as to determine the longitudinal position of said buoyant element relative to said casing, means for measuring changes in the electrical resistance of the said fluid between said two points of said casing, and means controlled by the last mentioned means for controlling the operation of said heating coil.

4. In a control system, an instrument having a non-conductive casing containing a viscous conductive fluid, a buoyant element suspended in said fluid, an electrical heating coil disposed in heat conductive relation to said fluid, an impedance bridge for measuring changes in the electrical resistance of the fluid between two predetermined points in said fluid, an impedance bridge for measuring changes in the electrical resistance of the fluid between each of the said two predetermined points and a point therebetween respectively so as to thereby determine the position of said buoyant element relative to said casing, and means controlled by the first mentioned impedance bridge for controlling the amount of electrical power supplied to said heating coil.

5. In a control system, an instrument having a non-conductive casing containing a viscous conductive fluid, a buoyant element freely suspended in said fluid so as to be radially centered in said casing when the latter is rotated about its axis, an electrical heating coil disposed in heat conducting relation to said fluid, an impedance bridge for measuring changes in the electrical resistance of the fluid between the ends of said casing, said fluid comprising at least a portion of one arm of said impedance bridge, an impedance bridge for measuring changes in the electrical resistance of the fluid between the ends and a central point of said casing respectively, said fluid comprising two arms of the last mentioned impedance bridge, and means controlled by the first mentioned bridge for controlling the electrical power supplied to said heating coil.

6. In viscosity control system for an instrument having a non-conductive casing containing a viscous conducting fluid, an acceleration sensitive buoyant element freely suspended in said fluid so as to be radially centered in said casing when the latter is rotated about its axis, an electrical heating coil disposed in heat conductive relation to said fluid, a pair of electrodes operatively secured to each end of said casing and each being in electrical contact with said fluid, a central electrode operatively secured to said casing and being in electrical contact with said conductive fluid, a pair of serially arranged resistances connected in parallel relation with respect to said end electrodes so as to define an impedance bridge wherein the respective electrical lead lines from said central electrode and a point between said pair of resistances comprise the output lines of said bridge, said bridge being adapted to measure variations in the electrical resistance of the fluid between each of said pair of electrodes and said central electrode respectively when said buoyant element is moved relative to said casing, an impedance bridge for measuring variations in the electrical resistance of the fluid between the said ends of said casing, the first mentioned impedance bridge defining one arm of the second mentioned impedance bridge, and means controlled by said second mentioned bridge for supplying electrical current to said heating coil.

7. A viscosity control system for an instrument having a non-conductive casing; comprising a viscous conducting fluid contained within the casing and continuously in a liquid state, comprising a pair of conductive electrodes respectively mounted at two predetermined points on said casing and being in electrical contact with said fluid, a heating element disposed in heat conductive relation to said viscous conductive fluid, means for measuring the electrical resistance of the said fluid between said predetermined points, and means controlled by said measuring means for controlling the operation of said heating element so that the current changes in said heating element are substantially proportional to the variations in output of said resistance measuring means.

8. A viscosity control system for an instrument having a non-conductive casing; comprising a viscous conductive fluid contained within the casing and continuously in a liquid state, comprising a pair of electrodes respectively mounted at two predetermined points on said casing and being in electrical contact with said fluid, an impedance bridge for measuring the electrical resistance of said fluid between said two predetermined points, said fluid comprising one arm of said bridge while the other three arms of said bridge each comprises a predetermined resistance, a heating coil disposed in heat conductive relation to said fluid, and means controlled by said bridge for supplying current to said heating coil.

References Cited in the file of this patent

UNITED STATES PATENTS

| | | |
|---|---|---|
| 2,397,962 | Hartz | Apr. 9, 1946 |
| 2,524,886 | Colander et al. | Oct. 10, 1950 |
| 2,525,179 | Polye | Oct. 10, 1950 |
| 2,602,591 | Wilson et al. | July 8, 1952 |
| 2,616,950 | Terpstra | Nov. 4, 1952 |
| 2,677,270 | Sanderson | May 4, 1954 |
| 2,720,626 | Wing | Oct. 11, 1955 |
| 2,769,140 | Obenshain | Oct. 30, 1956 |
| 2,777,640 | Kaufman | Jan. 15, 1957 |
| 2,797,912 | Trostler | July 2, 1957 |
| 2,801,388 | Ruge | July 30, 1957 |
| 2,840,366 | Wing | June 24, 1958 |
| 2,897,331 | McFarlane et al. | July 28, 1959 |